UNITED STATES PATENT OFFICE.

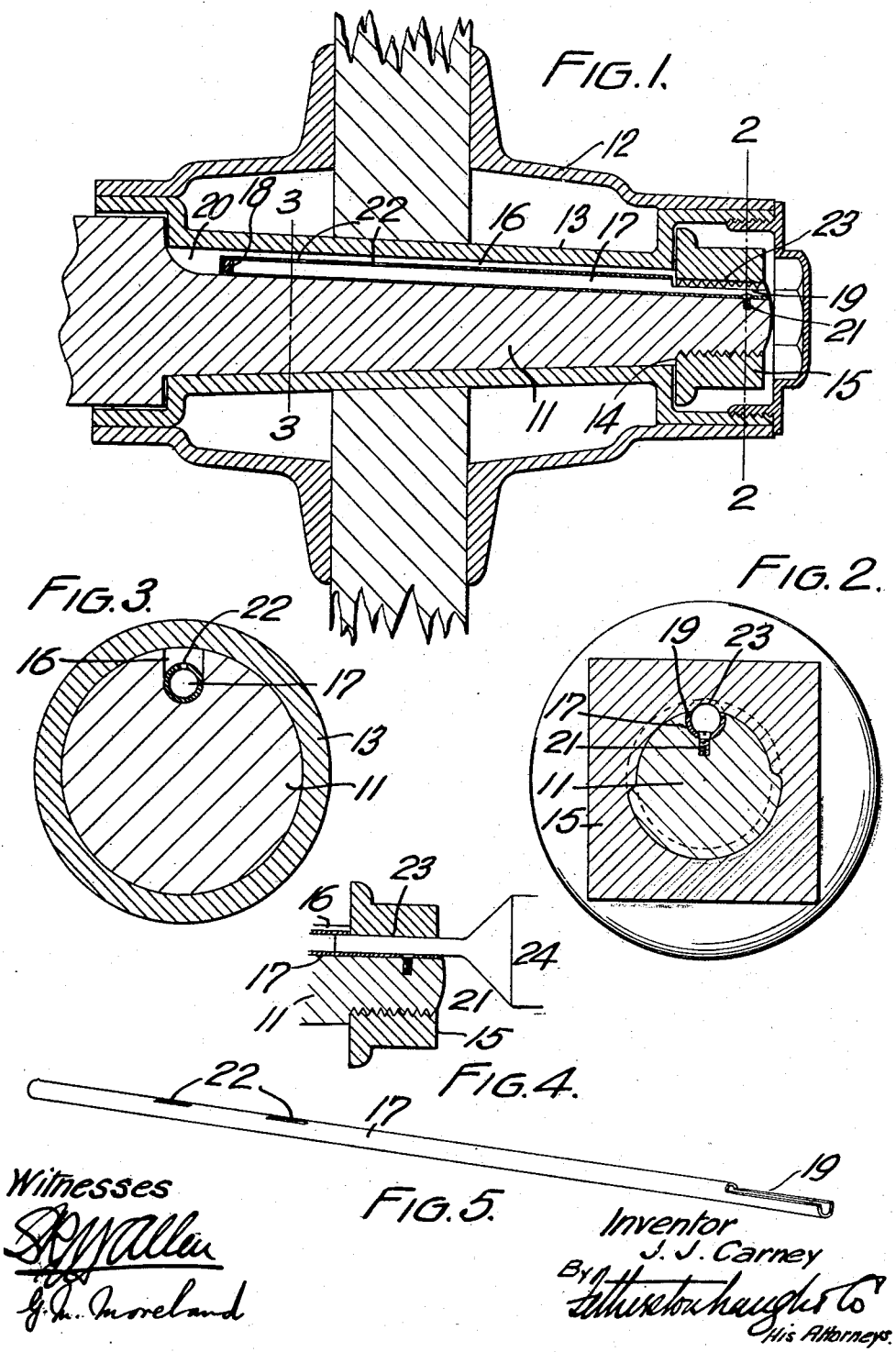

JAMES J. CARNEY, OF HAVERHILL, MASSACHUSETTS.

AXLE.

1,215,619.     Specification of Letters Patent.     Patented Feb. 13, 1917.

Application filed June 9, 1914, Serial No. 844,011. Renewed April 1, 1916. Serial No. 88,397.

*To all whom it may concern:*

Be it known that I, JAMES J. CARNEY, a citizen of the United States of America, and resident of Haverhill, in the State of Massachusetts and United States of America, have invented certain new and useful Improvements in Axles, of which the following is a full, clear, and exact description.

This invention relates to improvements in lubricators for vehicle axles, and the object is to provide a simple and efficient means for introducing lubricant between the axle and hub of a wheel without the necessity of removing the wheel.

A further object is to provide means for introducing a lubricant which will not be disturbed by the removal or application of the axle nut.

A still further object is to deliver the lubricant at a point from which it will distribute uniformly.

To accomplish these objects, I provide a tube closed at its inner end and seated in a groove in the top of the axle. The open end of the tube projects through the nut end, and is suitably cut away to provide clearance for the threads of the nut. The tube is held in place and against rotation by a pin adjacent the nut end. One or more apertures are provided in the upper surface of the tube for the escape of grease.

In the drawings which illustrate the invention:—

Figure 1 is a sectional view of a wheel hub and axle taken longitudinally of the axle.

Fig. 2 is a section on the line 2—2, Fig. 1.

Fig. 3 is a section on the line 3—3, Fig. 1.

Fig. 4 is a fragmentary view of the end of the axle showing the application of a grease gun.

Fig. 5 is a perspective view of the lubricant tube.

Referring more particularly to the drawings, 11 designates the bearing portion of a vehicle axle, which may be tapered or straight as desired, and 12 a wheel hub having a skein or bushing 13 bearing on the axle 11. The end of the axle is slightly reduced in diameter to form a shoulder 14 and threaded for the application of a nut 15, which screws up tightly against the shoulder and projects a sufficient distance therebeyond to engage the hub. The upper surface of the axle is provided with a longitudinal groove 16. This groove is formed sufficiently deeper than wide, so that when the lubricant carrying tube 17 is located therein, a channel will be left above the tube for flow of the lubricant. This groove extends out to the extremity of the axle, and owing to the shouldering and removal of metal for the threads is considerably shallower under the nut, as will be clearly seen. The tube 17 is somewhat shorter than the groove 16, and is provided with a closure cap 18 at its inner end, and is cut away on the upper surface at the outer end, as shown at 19, so that when the tube is in position in the groove, the cut away portion will permit the nut threads to clear the tube, so that the nut may be applied or removed without interfering with the tube. The tube being shorter than the groove, a pocket 20 is formed between the closed end of the tube and the end of the groove, in which any dirt that might work through between the axle and hub collars will accumulate in place of working over the entire bearing surface. To hold the tube in place and against revolution in the groove, a pin or screw 21 is passed through the lower portion of the tube into the axle at some convenient point opposite the cut away portion 19, which permits easy access to the pin. Toward the inner end, the upper surface of the tube is provided with one or more apertures 22 for the escape of lubricant. As the nut threads would form an obstruction at the entrance of the tube, and prevent the easy adjustment of a grease gun, a sufficient portion of these threads is cut away to restore the full size entrance to the bore of the tube, as shown at 23, so that the round nozzle of a grease gun 24 may be easily inserted and make a tight joint to prevent the escape of grease around same.

The operation of the device is extremely simple. When it is desired to grease a wheel, instead of unscrewing the nut and removing the wheel as is ordinarily done, the nozzle of a grease gun 24 is inserted in the open end of the tube, as clearly shown in Fig. 4, this nozzle preferably extending beyond the threads of the nut, as clearly shown. The gun is now operated and forces the lubricant therein through the tube 17 and out through the apertures 22 into the upper portion of the groove 16. Continued operation of the grease gun will force out sufficient grease to fill the upper portion of the groove, thus delivering the lubricant at the desired point without loss of time, waste of lubricant, or the possibility of introducing grit into the bearing. It will be readily understood that a great saving of time will be thus effected, and in addition the wheel will be much more perfectly lubricated, as it is possible to inject by this means a much larger amount of lubricant than is possible with the old method. Furthermore, the lubrication thus effected will be of a more lasting nature, owing not only to the increased amount of lubricant but also to the reserve stock of lubricant in the tube, which will work up against the bearing surface to a greater or lesser extent, as required.

Having thus described my invention, what I claim is:—

1. A vehicle axle having a bearing portion terminating in a threaded portion, said bearing and threaded portions having a groove formed longitudinally therein, a nut screwed on the threaded portion, and a tube in the groove passing into the bore of the nut and out of contact therewith.

2. A vehicle axle having a bearing portion threaded at one end, a nut screwed on the threaded end, said axle having a longitudinal groove therein intersecting the threads, a tube seated in said groove having one end thereof partially cut away to the depth of the threads, said nut having a groove intersecting the threads thereof arranged to complete the tube bore in the cut away portion thereof.

3. A device of the character described, comprising the combination with an axle having a longitudinal groove traversing the wheel bearing surface from end to end and extending to the end of the axle, of a nut screwed on said axle, a tube inserted in said groove having the outer end portion thereof cut away to clear the nut threads.

4. A device of the character described comprising the combination with an axle having a groove therein, a nut on the end of the axle having a groove in register with the axle groove, and a tube inserted in said axle groove having the entrance passage thereto formed partly in the bore of the tube and partly in the nut groove.

5. A device of the character described comprising an axle having a longitudinal groove therein, a nut having a groove therein positioned to register with the axle groove when the nut is tight, and a tube in said axle groove having the bore thereof completed by the nut groove.

6. A device of the character described, comprising an axle having a longitudinal groove therein, a nut having a groove therein positioned to register with the axle groove when the nut is tight, and a tube in said axle groove having the end thereof partially cut away to clear the threads of the nut, the bore of the tube in said cut away portion being completed by the nut groove.

7. A device of the class described comprising in combination an axle, a nut on the axle, said axle provided with a longitudinally extending opening therein, a tube in said opening apertured in its top having a closed end and an open end, and a cut away portion at the open end whereby a substantially semi-circular tongue projects from the bottom of the tube and a cut away portion is provided thereabove to clear the end threads.

8. A device of the character described, comprising the combination with a shouldered axle, a nut screwed on said axle beyond the shoulder thereof, of a lubricant groove deeper than wide extending longitudinally in the bearing surface of the axle, said groove being continued beyond the shoulder under the nut and of reduced depth, a tube lying in the bottom of said groove having the portion thereof beyond the axle shoulder partially cut away to clear the nut threads, said tube being closed at the end remote from the nut and provided adjacent the closed end with an aperture communicating with the groove above the tube, and a pin passing through said tube into the axle opposite the cut away portion thereof.

In witness whereof, I have hereunto set my hand, in the presence of two witnesses.

JAMES J. CARNEY.

Witnesses:
S. R. W. ALLEN,
G. M. MORELAND.